United States Patent
Enström et al.

(10) Patent No.: US 8,472,320 B2
(45) Date of Patent: Jun. 25, 2013

(54) JITTER BUFFER CONTROL

(75) Inventors: Daniel Enström, Gammelstad (SE); Fredrik Jansson, Sundbyberg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 359 days.

(21) Appl. No.: 12/518,218

(22) PCT Filed: Nov. 6, 2007

(86) PCT No.: PCT/SE2007/000981
§ 371 (c)(1), (2), (4) Date: Jun. 8, 2009

(87) PCT Pub. No.: WO2008/069719
PCT Pub. Date: Jun. 12, 2008

(65) Prior Publication Data
US 2010/0034332 A1 Feb. 11, 2010

Related U.S. Application Data

(60) Provisional application No. 60/868,775, filed on Dec. 6, 2006.

(51) Int. Cl.
*H04L 12/56* (2006.01)
(52) U.S. Cl.
USPC .......................... 370/231; 370/235; 370/428
(58) Field of Classification Search
None
See application file for complete search history.

(56) References Cited

U.S. PATENT DOCUMENTS

| | | | |
|---|---|---|---|
| 6,452,950 B1 * | 9/2002 | Ohlsson et al. | 370/516 |
| 6,665,317 B1 * | 12/2003 | Scott | 370/516 |
| 6,683,889 B1 * | 1/2004 | Shaffer et al. | 370/516 |
| 6,700,895 B1 * | 3/2004 | Kroll | 370/412 |
| 6,738,916 B1 * | 5/2004 | Gladden et al. | 713/400 |
| 6,859,460 B1 | 2/2005 | Chen | |
| 7,289,541 B2 * | 10/2007 | Elam | 370/508 |
| 7,359,324 B1 * | 4/2008 | Ouellette et al. | 370/230 |
| 7,596,488 B2 * | 9/2009 | Florencio et al. | 704/208 |
| 7,957,426 B1 * | 6/2011 | Choudhury et al. | 370/516 |
| 2002/0026310 A1 * | 2/2002 | Mochida et al. | 704/201 |
| 2002/0075857 A1 * | 6/2002 | LeBlanc | 370/352 |
| 2002/0167911 A1 | 11/2002 | Hickey | |
| 2003/0026275 A1 * | 2/2003 | Lanzafame et al. | 370/412 |
| 2005/0058145 A1 * | 3/2005 | Florencio et al. | 370/412 |
| 2005/0117594 A1 * | 6/2005 | Ryan | 370/401 |
| 2005/0180323 A1 | 8/2005 | Beightol et al. | |

(Continued)

FOREIGN PATENT DOCUMENTS

| | | |
|---|---|---|
| JP | H07-170290 A | 7/1995 |
| JP | H11-340987 A | 12/1999 |

(Continued)

*Primary Examiner* — Hassan Phillips
*Assistant Examiner* — Duc Duong

(57) ABSTRACT

A method of controlling an adaptable jitter buffer in accordance with the present invention detects a context description of data handled by the adaptable jitter buffer. Thereafter it is determined whether the detected context description is equal to a predetermined context description. If not, jitter buffer adaptation proceeds as normal. Otherwise it is determined whether the current target buffer depth is too low for the detected context description. If not, the target buffer depth is frozen to the current value. Otherwise it is increased and frozen at a higher value that is compatible with the detected context description.

24 Claims, 8 Drawing Sheets

U.S. PATENT DOCUMENTS

| | | | |
|---|---|---|---|
| 2006/0056383 A1* | 3/2006 | Black et al. | 370/350 |
| 2006/0088000 A1* | 4/2006 | Hannu et al. | 370/328 |
| 2007/0117548 A1* | 5/2007 | Fernandez-Alonso et al. | 455/414.1 |
| 2007/0206645 A1* | 9/2007 | Sundqvist et al. | 370/516 |
| 2011/0235541 A1* | 9/2011 | Choudhury et al. | 370/252 |

FOREIGN PATENT DOCUMENTS

| | | |
|---|---|---|
| JP | 2002-026969 A | 1/2002 |
| JP | 2004-356983 A | 12/2004 |
| WO | WO 0193516 A1 | 12/2001 |

\* cited by examiner

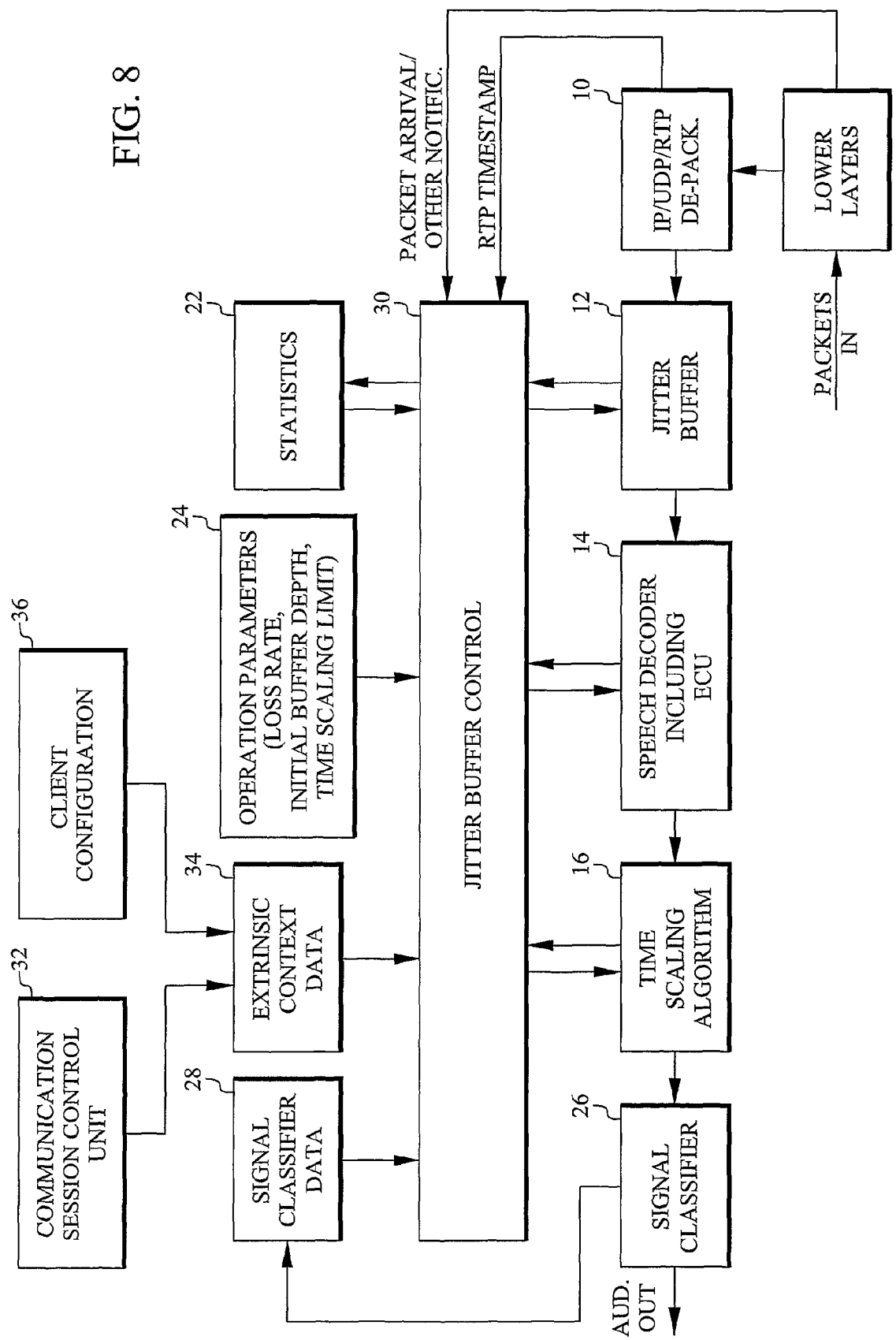

JITTER BUFFER CONTROL

This application claims the benefit of U.S. Provisional Application No. 60/868,775, filed Dec. 6, 2006, the disclosure of which is fully incorporated herein by reference.

TECHNICAL FIELD

The present invention generally relates to controlling an adaptive jitter buffer.

BACKGROUND

In any IP (Internet Protocol) based communication system there is a need to handle so-called delay jitter. Delay jitter occurs due to uneven delivery rates of packets to the IP endpoints, a variation of packet delivery timing which occurs due to various reasons. Examples are varying processing time in routers due to varying load, high load in access types using shared channels such as HSPA (High-Speed Packet Access) and WLAN (Wireless Local Area Network), etc. All IP-based systems show this kind of behavior, in some cases more than others.

A speech decoder requires an even flow of packets delivered at regular intervals in order to process and render a speech signal. If this even rate cannot be maintained, encoded speech frames delivered too soon after the preceding frame might be dropped and if a speech frame is delivered too late, error concealment will be used to render the speech instead. Both cases result in degraded speech quality.

In VoIP (Voice-over-IP) services, a so-called jitter buffer is used between the packet receiving entity and the speech decoder to act as a speech frame rate equalizer. If this buffer is sufficiently deep, the variation, or the delay jitter, will be handled by the buffer and encoded speech frames can be delivered to the speech decoder at an even rate.

A drawback with a jitter buffer is that if the buffer depth is larger than the delay jitter, an unnecessary delay will be introduced. Since low conversational delay is a key feature of real-time communication services, this degrades the conversational quality. Hence, jitter buffer adaptation is used to change the depth of the buffer during runtime through a control mechanism. The input to this control mechanism is typically statistics assembled during the session making it possible to tune the buffer depth to optimize the trade-off between error concealment operations triggered by the jitter of the transport link and still minimize the conversational delay.

There are different mechanisms available to adapt the jitter buffer depth. They can be divided into two different categories; frame-based adaptive mechanisms and sample-based adaptive mechanisms.

Frame-based mechanisms operate by inserting or removing full speech frames into the buffer. If used during silence periods (i.e. in the beginning or in the end of a talk spurt) the impact of the adaptation action is minor on the media quality. The major drawback occurs if the speech activity is high with few and/or short silence periods. In that case, adaptation will be forced to occur during an active speech period with severe quality degradation as a result.

Sample-based mechanisms operate by stretching and/or compressing the decoded speech signal in the time domain. Different similarity methods can be used to identify patterns in the speech signal which can be expanded or compressed to change the timeline of the speech signal. By doing this, the time each speech frame represents can be changed so that the speech decoder can vary the rate of which it requires delivery of encoded speech frames from the jitter buffer. The consequence is a buffer build-up or a buffer decrease; jitter buffer level adaptation.

Sample-based mechanisms also introduce media quality artifacts when performing the adaptation. The sample-based mechanism works well with stationary signals but transients are more challenging. Further, if the speech signal has some periodic content, which is the case for most popular music, the time scaling operation is easily heard and can be quite annoying.

SUMMARY

Since both sample-based adaptation mechanisms and frame-based mechanisms lead to artifacts, they should be used as little as possible. Preferably they should be used only when there is a need to keep the conversational delay low. For most other use cases, for example whenever a periodicity (such as music) is present in the encoded speech data, conventional adaptation should be avoided.

An object of the present invention is to provide a control mechanism that makes it possible to modify conventional jitter buffer adaptation.

This object is achieved in accordance with the attached claims.

Briefly, the present invention involves detecting a context description of data handled by the adaptable jitter buffer and overriding jitter buffer depth minimization for predetermined detected context descriptions. The context description can be intrinsic or extrinsic to the data handled by the buffer.

BRIEF DESCRIPTION OF THE DRAWINGS

The invention, together with further objects and advantages thereof, may best be understood by making reference to the following description taken together with the accompanying drawings, in which:

FIG. 8 is a block diagram of another embodiment of an adaptive jitter buffer controller in accordance with the present invention.

DETAILED DESCRIPTION

In the following description the same reference designations will be used for elements performing the same or similar functions.

Figure 1:
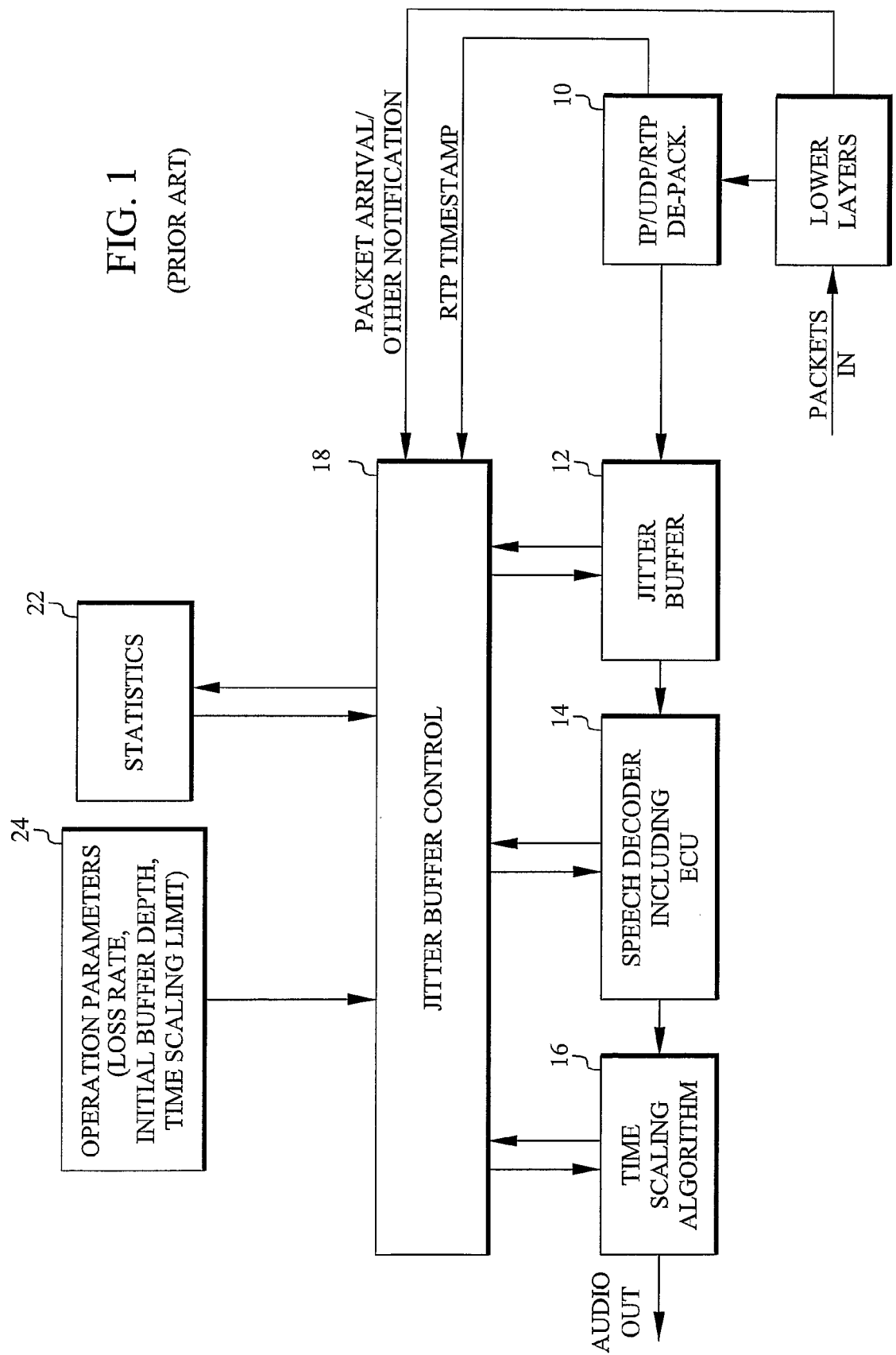
FIG. 1 is a block diagram of a conventional adaptive jitter buffer implementation.

FIG. 1 is a block diagram of a conventional adaptive jitter buffer implementation, for example as described in [1]. Received packets are forwarded from lower layers to a de-packetizer 10, where they are de-packetized. The payloads of the de-packetized packets are forwarded to a jitter buffer 12, in which they are buffered and thereafter forwarded to a speech decoder 14 (typically including an ECU (Error Concealment Unit)). The decoded signals are forwarded to a time scaling algorithm 16, which generates the final audio output. Elements 12, 14 and 16 are controlled by a jitter buffer control unit 18. Control unit 18 receives control information from de-packetizer 10, lower layers, a statistics unit 22 and operation parameters unit 24. Jitter buffer control unit 18 uses this control information to adapt (minimize) the buffer depth to the prevailing network conditions.

Figure 2:
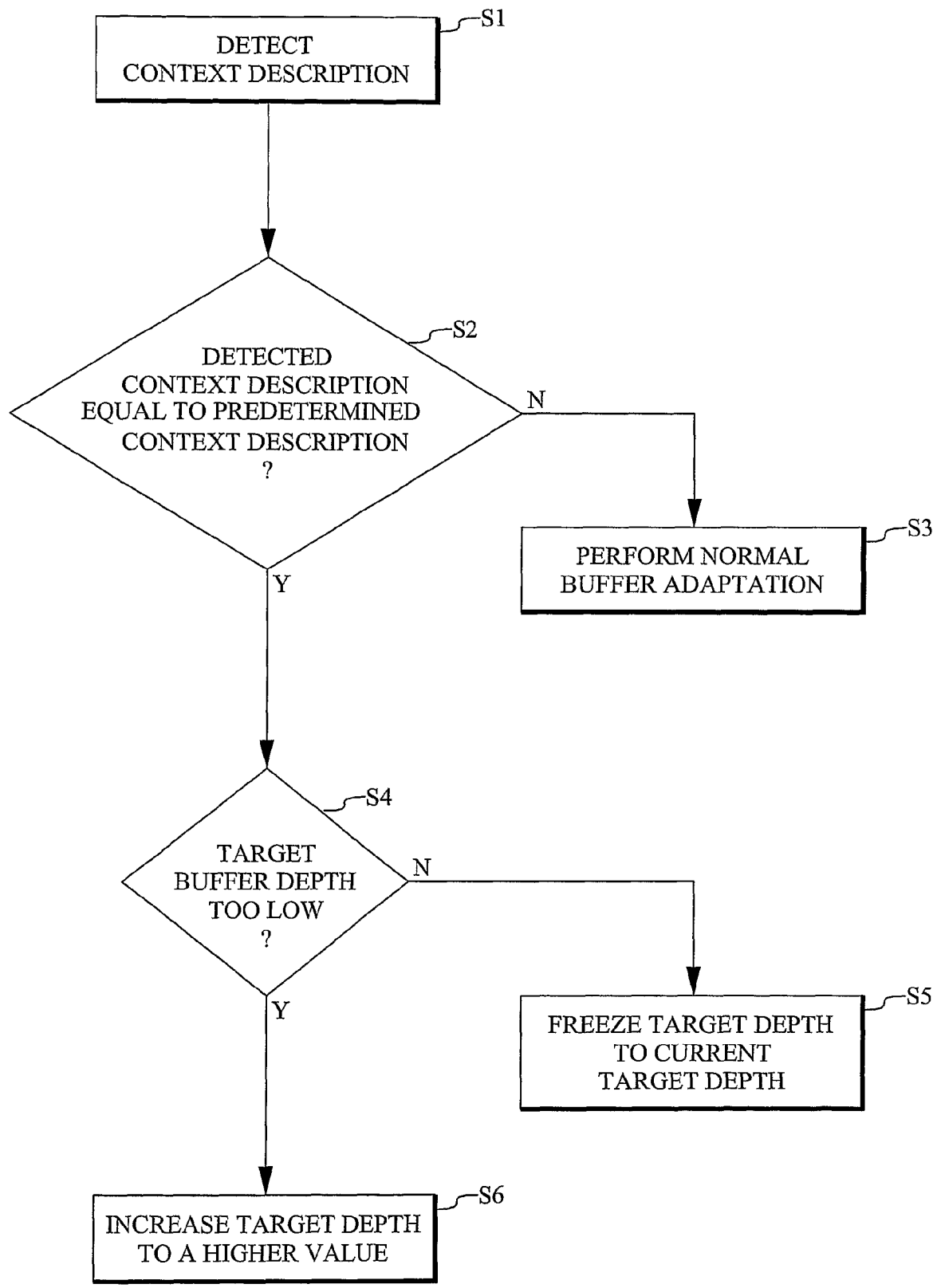
FIG. 2 is a flow chart illustrating an embodiment of the method of controlling an adaptable jitter buffer in accordance with the present invention.

FIG. 2 is a flow chart illustrating an embodiment of the method of controlling an adaptable jitter buffer in accordance with the present invention. Step S1 detects a context description of data handled by the adaptable jitter buffer. Step S2 determines whether the detected context description is equal to a predetermined context description (which can be one of several possible context descriptions). If not, jitter buffer adaptation proceeds as normal in step S3. Otherwise step S4 determines whether the current target buffer depth is too low for the detected context description. If not, step S5 freezes the target buffer depth to the current value. Otherwise step S6 increases and freezes the target buffer depth at a higher value that is compatible with the detected context description. Thus, both steps S5 and S6 override the normal jitter buffer adaptation. Steps S4 and S6 may not be required, depending on the type of detected context description.

The context description can be intrinsic or extrinsic to the data handled by the buffer. An example of an intrinsic context description is the content of the data handled by the jitter buffer. The content of the signal determines how big the quality degradation will be as a result of the adaptation mechanism. If periodic signals, such as music, are present in the signal, the effect of the adaptation procedure will be a severe quality degradation of the signal. Such adaptation should therefore be avoided or overridden.

As an example, there is one special use case where this is clearly applicable and that is when using music on hold. In such a procedure, one end-point of the conversation puts the other on hold and when doing so, music is being played out at the end-point which has been put on hold. In this case, there is no requirement for low conversational delay since the media only flows in one direction.

In accordance with one embodiment of the present invention, a signal classification algorithm which can classify the incoming signal and detect periodic content can be used to send additional data to the jitter buffer control algorithm. The response from the control algorithm could either be to temporarily turn off the adaptation by freezing the target buffer depth at the current level or to immediately trigger an upward adaptation by freezing the target buffer depth at a higher level. In either case adaptation artifacts would be reduced during the time where the periodic content is detected and the average media quality would increase. When the classification indicates speech again, the adaptation returns to its normal state, in which the buffer depth is minimized. Note that this embodiment is especially useful for links which can show significant jitter such as HSPA (High-Speed Packet Access), WLAN (Wireless Local Area Network), WiMAX (Worldwide Interoperability for Microwave Access) and other access technologies based on shared channels.

Figure 3:
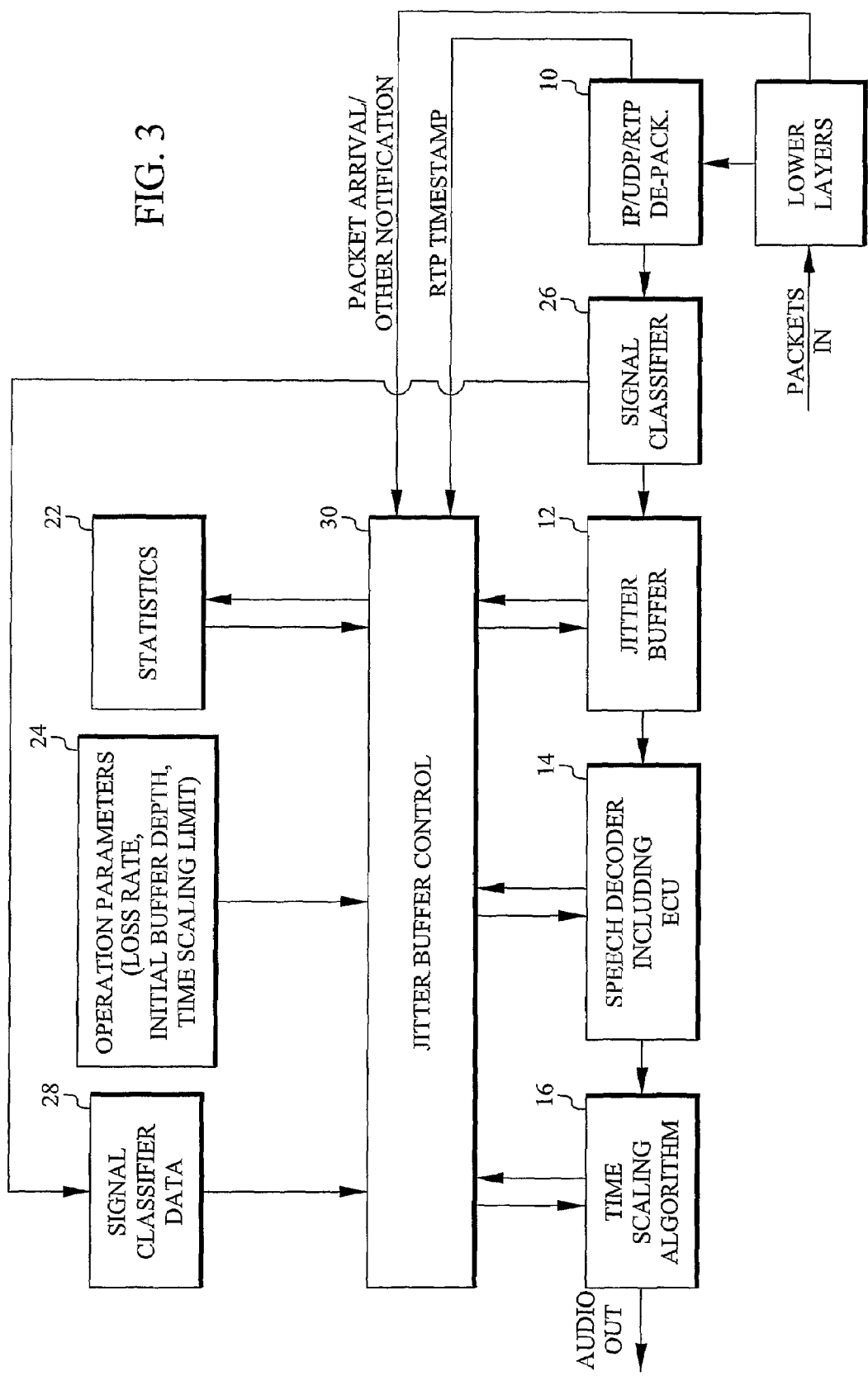
FIG. 3 is a block diagram of an embodiment of an adaptive jitter buffer controller in accordance with the present invention.

FIG. 3 is a block diagram of an embodiment of an adaptive jitter buffer controller in accordance with the present invention. In this embodiment elements 10, 12, 14, 16, 22, 24 are similar to elements having the same reference numerals in FIG. 1 and will thus not be described in detail. A signal classifier 26 is inserted in the encoded domain between de-packetizer 10 and jitter buffer 12. Classification data are forwarded to a signal classifier data storage unit 28. The output of unit 28 is provided as a control signal to jitter buffer control unit 30. The response to the control signal is aimed to reduce adaptation artifacts by overriding normal adaptation (buffer depth minimization). This is done either by freezing the target buffer depth at its current value or by triggering an immediate upward adaptation by freezing the target buffer depth at a higher value. The latter choice is valid if the current value is deemed to be too low.

The signal classifier is tuned to detect signal content which makes jitter buffer adaptation artifacts more severe. One example implementation would comprise a signal classifier which can detect music content and restrict the jitter buffer adaptation accordingly. Another example implementation would comprise a signal classifier capable of detecting severe background noise which would increase the quality degradation of the adaptation artifacts. Principles for signal classification in the encoded domain are discussed in, for example, [2].

Figure 4:
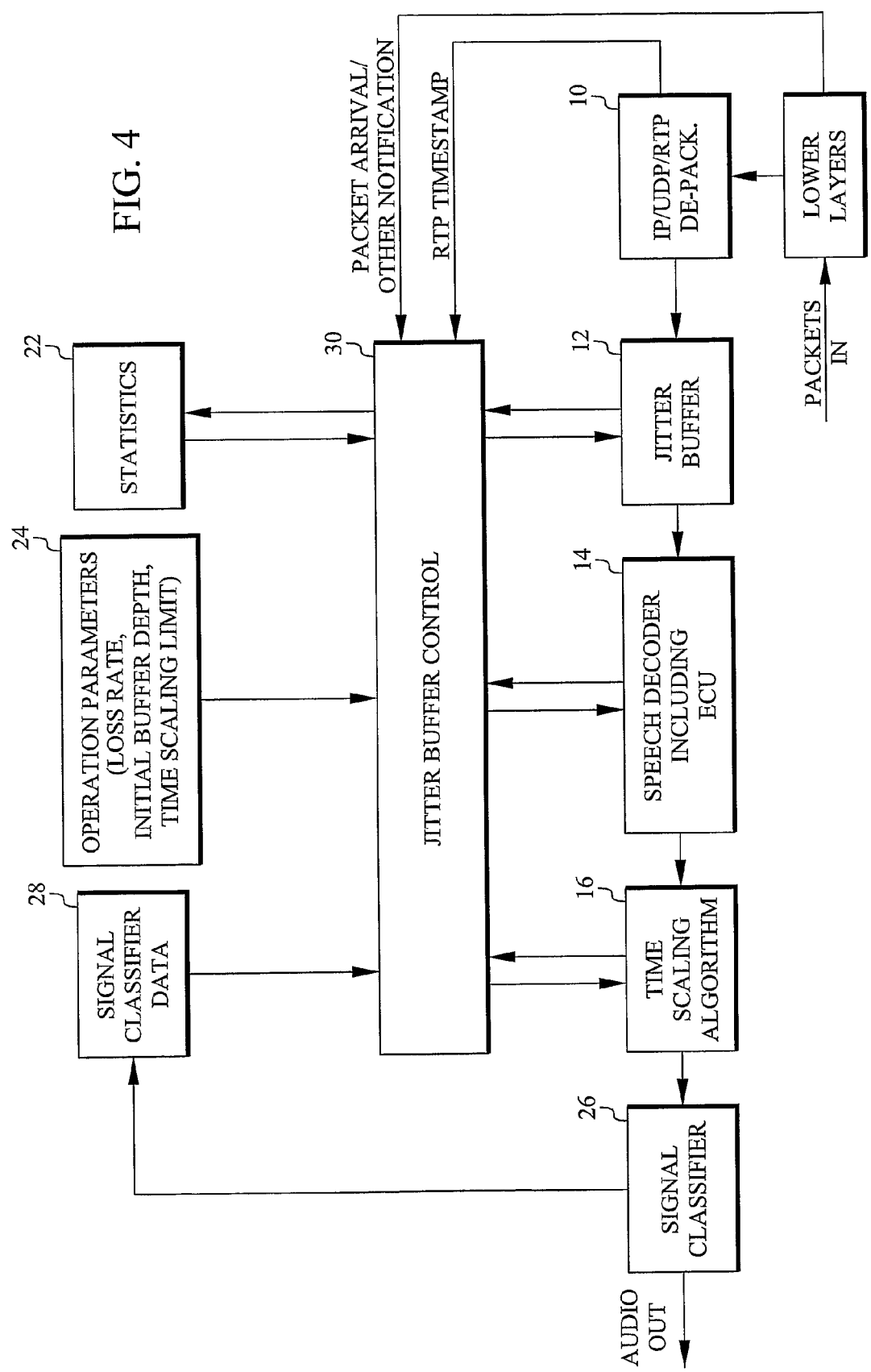
FIG. 4 is a block diagram of another embodiment of an adaptive jitter buffer controller in accordance with the present invention.

A variation of the embodiment illustrated in FIG. 3 is shown in FIG. 4. In this embodiment the signal classifier 26 is provided after the time scaling algorithm 16 and performs signal classification in the time (sample) domain. Another possibility is to provide the classifier directly after the decoder. In both cases classification is performed on the decoded signal. Principles for signal classification in the decoded domain are discussed in, for example, [3]. Music may be detected by using the zero crossing ratio described in, for example, MPEG-7 (Moving Picture Experts Group).

Although elements 26 and 28 have been illustrated as separate units, it is also possible to combine them into a single unit.

Figure 5:
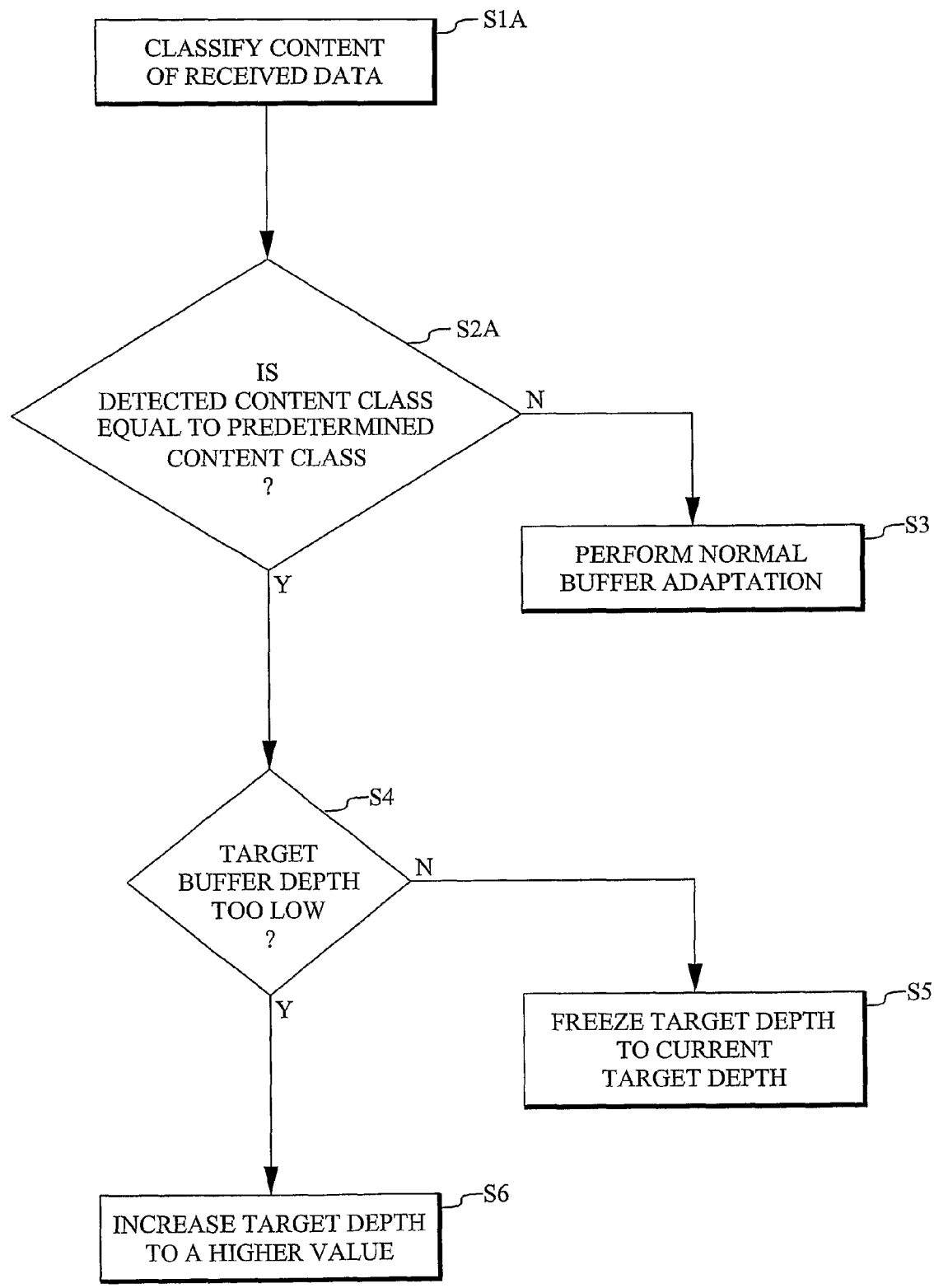
FIG. 5 is a flow chart of an embodiment of the method of controlling an adaptable jitter buffer in accordance with the present invention.

FIG. 5 is a flow chart of an embodiment of the method of controlling an adaptable jitter buffer in accordance with the present invention. This embodiment extracts an intrinsic context description from the data handled by the adaptable jitter buffer 12 (either in the encoded or decoded domain). Step S1A classifies the content of the received data (for example music/speech, background noise/speech, etc). Step S2A determines whether the detected content class is equal to a predetermined content class (for example music or background noise). The remaining steps S3-S6 are equivalent to steps S3-S6 in FIG. 2.

Another way of reducing the adaptation artifacts is to put the current signal into its proper extrinsic context. In a normal conversation, the media flows will be fully duplex. The session negotiation would indicate that both end-points would be in send-receive mode. In this case, normal guidelines for jitter buffer operation apply, which implies minimizing the buffer depth at all times without allowing the jitter induced loss rates to grow. However, when a call is being put on hold, both clients will see that this session is no longer a full duplex session. Since media now only is allowed to flow in one direction, the delay criteria may be relaxed.

In this scenario, although no periodic signal may have been detected, a client that still has allocated its jitter buffer and speech decoder and is prepared to receive and process media, does not have to minimize the buffering delay as during a full duplex call. The buffer can freeze the adaptation or adapt upwards as soon as the session flow parameters have been updated, avoid buffer depth minimization as long as the media flow is only in one direction and resume normal operation when the session is restored to full duplex. Also in this case, adaptation artifacts are reduced and the media quality is enhanced.

Figure 6:
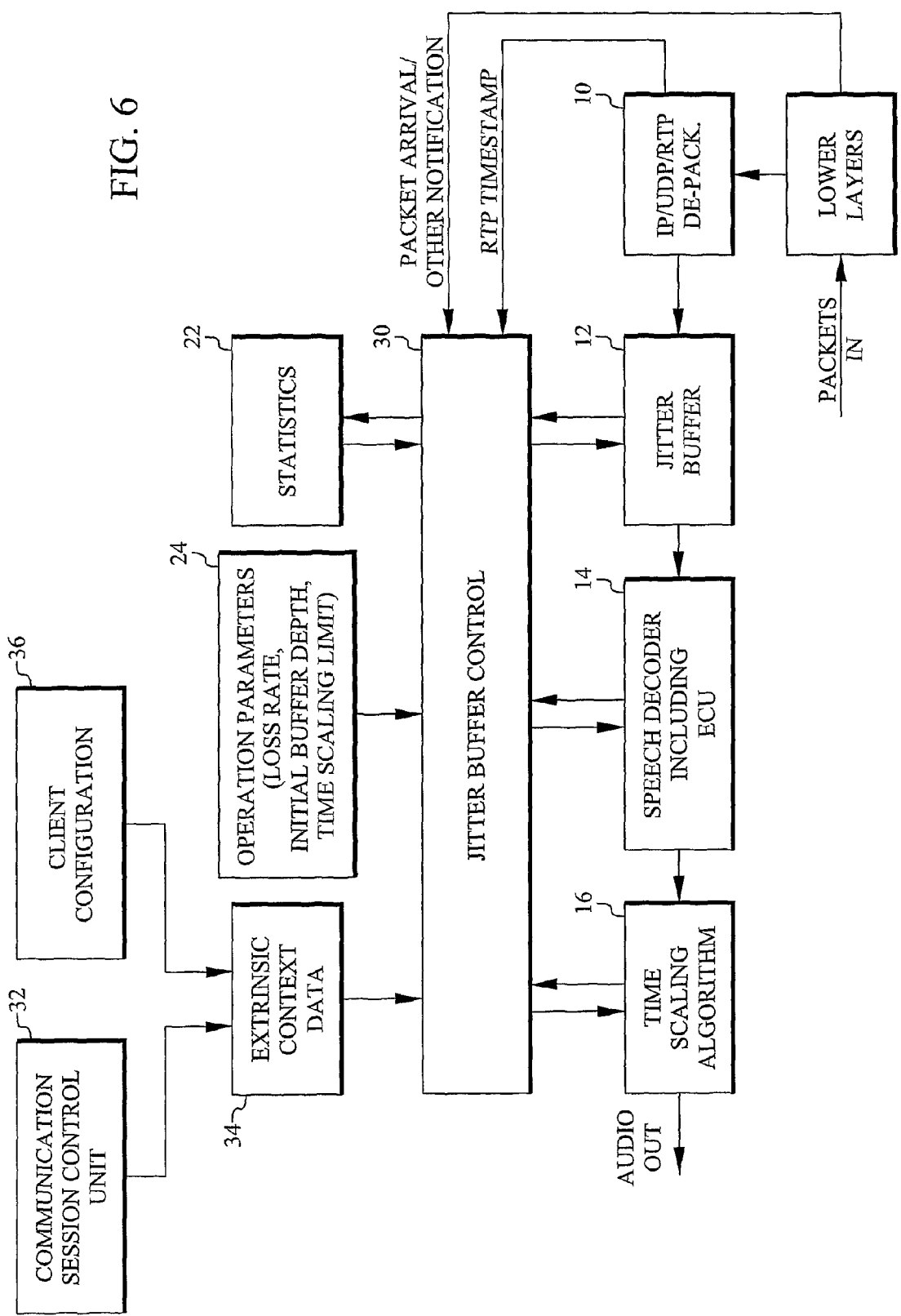
FIG. 6 is a block diagram of another embodiment of an adaptive jitter buffer controller in accordance with the present invention.

FIG. 6 is a block diagram of another embodiment of an adaptive jitter buffer controller in accordance with the present invention. This embodiment is not based on detection of a specific content of the signal (intrinsic context description) but rather in which extrinsic context the signal is used.

When a communication session is set-up, a session control protocol is used. For example, if the session control protocol is based on SIP (Session Initiation Protocol) and SDP (Session Description Protocol), there is media flow information present in the SDP which can be detected by a communication session control unit 32 and used by an extrinsic context data storage unit 34 as an extrinsic context description. The SDP parameters include an attribute which indicates in which direction media will flow during the session. That attribute can hold the following values; "sendrecv", "sendonly", "recvonly" and "inactive". For a full duplex session, the media flow attribute is set to "sendrecv" but for an end-party which only is allowed to receive media, with its session media flow attribute set to "recvonly", the jitter buffer adaptation control algorithm can relax its delay minimizing efforts either by freezing the target buffer depth at its current value or by triggering an immediate upward adaptation by freezing the target buffer depth at a higher value. The latter choice is valid if the current value is deemed to be too low.

In IMS (IP Multimedia Subsystem) Multimedia Telephony, the supplementary service called HOLD is supported. In this service, the session media flow attribute is typically changed from "sendrecv" to "sendonly" and "recvonly" respectively. The use of a session context parameter as an extrinsic context description in the adaptation control in this case would increase the media quality at the client on "recvonly" if any media such as announcements and music-on-hold is used.

Further, different operators may have different service configurations for the particular service. E.g. different user subscriptions may be profiled with different characteristics. A "gold" subscriber may utilize the performance enhanced music-on-hold media quality enabled via the present invention while the "economy" subscriber may not. This feature is implemented by a client configuration unit 36 in FIG. 6.

Figure 7:
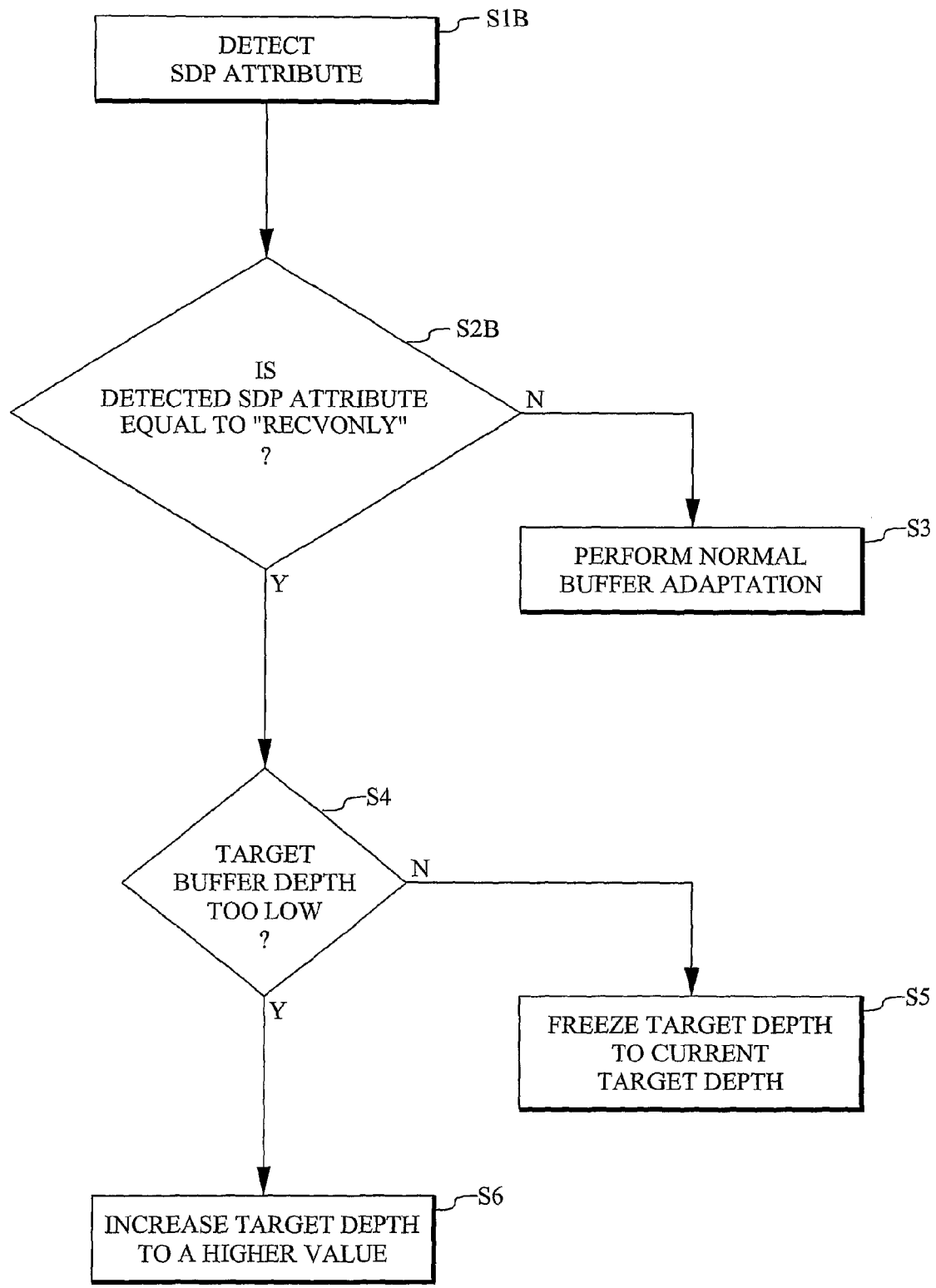
FIG. 7 is a flow chart of another embodiment of the method of controlling an adaptable jitter buffer in accordance with the present invention.

FIG. 7 is a flow chart of another embodiment of the method of controlling an adaptable jitter buffer in accordance with the present invention. This embodiment extracts an extrinsic context description of the data handled by the adaptable jitter buffer 12. Step S1B detects the SDP media flow attribute of the data handled by the jitter buffer. Step S2B determines whether the detected SDP media flow attribute is equal to "recvonly". The remaining steps S3-S6 are equivalent to steps S3-S6 in FIG. 2.

In the description above the intrinsic and extrinsic context description control mechanisms have been described in separate embodiments. However, the two mechanisms can also be combined, as illustrated in FIG. 8.

Regarding the increase in target jitter buffer depth, it depends on the jitter variations introduced by the channel. As a rule of thumb, an increase of the order of 100% may be feasible. However, this may be too high if the jitter variations are small. In general the increase should not be exaggerated, since this will increase the time it takes to obtain a minimum jitter buffer depth again when normal adaptation is restored.

Although the described embodiments illustrate sample based jitter buffer control, it is appreciated that the same principles can also be applied to frame based jitter buffer control. The essential difference in the block diagrams would be the absence of a time scaling algorithm 16.

In the embodiments described above the target buffer depth was used as a parameter for modifying the jitter buffer control algorithm. An alternative is to use the target frame loss rate as a control parameter instead. Thus, the target frame loss rate may be frozen at its current value. The adaptation algorithm will increase the buffer depth until this loss rate is obtained. If the current target frame loss rate is deemed to be too high, it can be frozen at a predetermined lower value. Again, the adaptation algorithm will increase the buffer depth until this loss rate is obtained. An advantage of this embodiment is that the frame loss rate is highly correlated with obtained signal quality.

The functionality of the various blocks in the described embodiments is typically obtained by one or more micro processors or micro/signal processor combinations and corresponding software.

An advantage of the present invention is that it makes it possible to increase the media quality when the end-to-end delay criterion of a session is relaxed compared to the default state of operation. Making use of intrinsic and/or extrinsic signal context to control the jitter buffer adaptation control algorithm is a new way to further optimize media quality, especially when shared channels are used.

It will be understood by those skilled in the art that various modifications and changes may be made to the present invention without departure from the scope thereof, which is defined by the appended claims.

ABBREVIATIONS

ECU Error Concealment Unit
HSPA High-Speed Packet Access
IMS IP Multimedia Subsystem
IP Internet Protocol
MPEG Moving Picture Experts Group
SDP Session Description Protocol
SIP Session Initiation Protocol
VoIP Voice-over-IP
WiMAX Worldwide Interoperability for Microwave Access
WLAN Wireless Local Area Network

REFERENCES

[1] Jitter buffer; (IMS Multimedia Telephony over Cellular Systems, ISBN: 978-0-470-05855-8, Wiley 2007, section 5.3.3, pp 154-163)

[2] "A fuzzy approach towards perceptual classification and segmentation of MP3/AAC audio", Kiranyaz, S. Qureshi, A. F. Gabbouj, M., First International Symposium on Control, Communications and Signal Processing, 21-24 Mar. 2004, pp 727-730.

[3] Signal classification; MPEG-7 standard (ISO/IEC 15938-4:2002, Information technology—Multimedia content description interface—Part 4: Audio)

The invention claimed is:

1. A method of controlling an adaptable jitter buffer, comprising:
   detecting a context description of data handled by the adaptable jitter buffer;
   overriding jitter buffer depth minimization for predetermined detected context descriptions, wherein overriding comprises freezing a target jitter buffer depth at a particular value; and returning to jitter buffer depth minimization upon detecting a second context description of data handled by the adaptable jitter buffer.

2. The method of claim 1, wherein the overriding step includes freezing a target jitter buffer depth at a current value.

3. The method of claim 1, wherein the overriding step includes freezing a target jitter buffer depth at a predetermined value that is higher than a current value.

4. The method of claim 1, wherein the overriding step includes freezing a target frame loss rate at a current value.

5. The method of claim 1, wherein the overriding step includes freezing a target frame loss rate at a predetermined value that is lower than a current value.

6. The method of claim 1, wherein the context described by the detected context description is intrinsic to the data handled by the adaptable jitter buffer.

7. The method of claim 6, wherein the context description is detected from the data handled by the adaptable jitter buffer.

8. The method of claim 7, wherein the context description is detected from encoded data forwarded to the adaptable jitter buffer.

9. The method of claim 7, wherein the context description is detected from data that has been decoded after passing through the adaptable jitter buffer.

10. The method of claim 1, wherein the context described by the detected context description is extrinsic to the data handled by the adaptable jitter buffer.

11. The method of claim 10, wherein a service context of data handled by the adaptable jitter buffer is detected from communication session data.

12. The method of claim 10, wherein a service context of data handled by the adaptable jitter buffer is detected from client configuration data.

13. An adaptable jitter buffer controller, comprising:
a processor configured for detecting a context description of data handled by the adaptable jitter buffer;
the processor further configured for overriding jitter buffer depth minimization for predetermined detected context descriptions, wherein the processor is further configured for freezing a target jitter buffer depth at a particular value; and
the processor further configured for returning to jitter buffer depth minimization upon detecting a second context description of data handled by the adaptable jitter buffer.

14. The controller of claim 13, wherein the processor is further configured for freezing a target jitter buffer depth at a current value.

15. The controller of claim 13, wherein the processor is further configured for freezing a target jitter buffer depth at a predetermined value that is higher than a current value.

16. The controller of claim 13, wherein the processor is further configured for freezing a target frame loss rate at a current value.

17. The controller of claim 13, wherein the processor is further configured for freezing a target frame loss rate at a predetermined value that is lower than a current value.

18. The controller of claim 13, wherein the processor detects a context description that is intrinsic to the data handled by the adaptable jitter buffer.

19. The controller of claim 18, wherein the processor detects a context description from the data handled by the adaptable jitter buffer.

20. The controller of claim 19, wherein the processor detects a context description from encoded data forwarded to the adaptable jitter buffer.

21. The controller of claim 19, wherein the processor detects a context description from data that has been decoded after passing through the adaptable jitter buffer.

22. The controller of claim 13, wherein the processor detects a context description that is extrinsic to the data handled by the adaptable jitter buffer.

23. The controller of claim 22, wherein the processor detects a service context of data handled by the adaptable jitter buffer from communication session data.

24. The controller of claim 22, wherein the processor detects a service context of data handled by the adaptable jitter buffer from client configuration data.

* * * * *